United States Patent
Lee et al.

(10) Patent No.: US 11,764,427 B2
(45) Date of Patent: Sep. 19, 2023

(54) METAL-AIR BATTERY AND OPERATING METHOD OF THE METAL-AIR BATTERY

(71) Applicant: Samsung Electronics Co., Ltd., Suwon-si (KR)

(72) Inventors: Hyunpyo Lee, Seoul (KR); Kyounghwan Choi, Suwon-si (KR); Mokwon Kim, Suwon-si (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 298 days.

(21) Appl. No.: 17/353,979

(22) Filed: Jun. 22, 2021

(65) Prior Publication Data

US 2022/0223945 A1 Jul. 14, 2022

(30) Foreign Application Priority Data

Jan. 11, 2021 (KR) ........................ 10-2021-0003570

(51) Int. Cl.
*H01M 12/08* (2006.01)
*H01M 8/04119* (2016.01)
*H01M 4/36* (2006.01)
*H01M 4/40* (2006.01)
*B01D 53/04* (2006.01)

(52) U.S. Cl.
CPC ........ *H01M 12/08* (2013.01); *B01D 53/0454* (2013.01); *H01M 4/366* (2013.01); *H01M 4/405* (2013.01); *H01M 8/04164* (2013.01)

(58) Field of Classification Search
CPC ... H01M 12/00; H01M 12/08; H01M 8/04164
See application file for complete search history.

(56) References Cited

U.S. PATENT DOCUMENTS

| | | | |
|---|---|---|---|
| 5,560,999 | A | 10/1996 | Pedicini et al. |
| 6,087,029 | A | 7/2000 | Golovin et al. |
| 10,103,397 | B2 | 10/2018 | Kwon et al. |
| 10,411,226 | B2 | 9/2019 | Takahashi et al. |
| 2014/0127593 | A1 | 5/2014 | Hong et al. |
| 2017/0033379 | A1* | 2/2017 | Kwon ............... H01M 8/04507 |
| 2020/0153067 | A1 | 5/2020 | Kim et al. |

FOREIGN PATENT DOCUMENTS

| KR | 1020150054469 A | 5/2015 |
|---|---|---|
| KR | 101920786 B1 | 11/2018 |
| KR | 1020190080248 A | 7/2019 |
| KR | 1020200053998 A | 5/2020 |

* cited by examiner

*Primary Examiner* — Christopher P Domone
(74) *Attorney, Agent, or Firm* — CANTOR COLBURN LLP (57) ABSTRACT

A metal-air battery includes: a cell module configured to generate electricity by oxidation of a metal and reduction of oxygen and water; a water vapor supply unit configured to supply a first water vapor to the cell module; a moisture storage unit configured to supply a first moisture at a first flow rate to the water vapor supply unit; and a condensing unit configured to supply a second moisture at a second flow rate to the water vapor supply unit by condensing the water vapor condensed from the cell module.

20 Claims, 6 Drawing Sheets

METAL-AIR BATTERY AND OPERATING METHOD OF THE METAL-AIR BATTERY

CROSS-REFERENCE TO RELATED APPLICATION

This application claims priority to Korean Patent Application No. 10-2021-0003570, filed on Jan. 11, 2021, in the Korean Intellectual Property Office, and the benefits accruing therefrom under 35 U.S.C. § 119, the content of which is incorporated by reference herein in its entirety.

BACKGROUND

1. Field

The present disclosure relates to a secondary battery, and more particularly, to a metal-air battery and a method of operating the metal-air battery.

2. Description of the Related Art

A metal-air battery includes an anode capable of absorbing and releasing ions and a cathode using oxygen in air as an active material. Reduction and oxidation reactions of oxygen introduced from the outside occur at the cathode, and oxidation and reduction reactions of metals occur at the anode, and the metal-air battery converts chemical energy generated at this time into electrical energy and extracts the electrical energy. For example, a metal-air battery absorbs oxygen when the metal-air battery is discharged and releases oxygen when charged. In this way, because the metal-air battery uses oxygen present in the air, energy density of the metal-air battery may be greatly improved. For example, a metal-air battery may have an energy density several times greater than that of a lithium ion battery of the related art In a metal-air battery, the cathode plays the role of an electron transport path and an ion transport path, and thus, the capacity or performance of the metal-air battery may be significantly affected by, for example, a material and composition of the cathode (air electrode). When the metal-air battery is implemented as an all-solid metal-air battery including a solid electrolyte, due to low metal ion conductivity and electron conductivity of a cathode and a solid electrolyte and high interfacial resistance, a problem of reducing a reaction rate may occur. Thus, there remains a need to maintain metal ion conductivity and electron conductivity in a cathode of an all-solid metal-air battery.

SUMMARY

Provided are metal-air batteries having high charge and discharge characteristics, and methods of operating the metal-air batteries.

Provided are all-solid metal-air batteries capable of improving metal ion conductivity and electron conductivity and reducing interfacial resistance and methods of operating the solid state metal-air batteries.

Provided are metal-air batteries having high energy density and methods of operating the metal-air batteries.

Additional aspects will be set forth in part in the description which follows and, in part, will be apparent from the description, or may be learned by practice of the presented embodiments of the disclosure.

According to an aspect of an embodiment, a metal-air battery includes: a cell module configured to generate electricity by oxidation of a metal and reduction of oxygen and water; a water vapor supply unit configured to supply a first water vapor to the cell module; a moisture storage unit configured to supply a first moisture at a first flow rate to the water vapor supply unit; and a condensing unit configured to supply a second moisture at a second flow rate to the water vapor supply unit by condensing a second water vapor condensed from the cell module.

The second flow rate may be determined according to a recovery rate of the condensing unit, and the first flow rate may be configured to increase as the second flow rate decreases.

The recovery rate of the condensing unit may be 0.5 or more and less than 1, and the moisture storage unit may store moisture at a rate of 0.1 liter or more and 6.0 liters or less per 1 kilowatt-hour (kWh).

The metal-air battery may further include a first fluid interrupting unit to interrupt a flow of the first moisture at the first flow rate, which is communicated from the moisture storage unit to the water vapor supply unit.

The metal-air battery may further include a controller configured to control whether to open or close the first fluid interrupting unit according to the second flow rate of the second moisture transferred from the condensing unit to the water vapor supply unit.

The metal-air battery may further include a pump configured to apply a negative pressure to the cell module to recover the second water vapor from the battery module.

The metal-air battery may further include an air purification module configured to purify air supplied from outside of the metal-air battery and to provide purified air to the cell module.

The cell module may include an anode unit including a metal, a cathode unit configured to use oxygen and water as an active material, and a solid electrolyte layer disposed between the anode unit and the cathode unit.

The cathode unit may include a porous composite conductive material, and the porous composite conductive material may include a lithium titanium oxide (LTO), a lithium manganese oxide (LMO), a lithium cobalt oxide (LCO), a lithium manganese nickel oxide (LMNO), a lithium nickel manganese cobalt (NMC) oxide, a lithium nickel oxide (LNO), lithium iron phosphate (LFP), lithium iron manganese phosphate (LFMP), a lithium lanthanum titanium oxide (LLTO), lithium aluminum titanium phosphate (LATP), a lithium lanthanum manganese oxide (LLMnO), a lithium lanthanum ruthenium oxide (LLRuO), a reduction product of the porous composite conductive material, or a combination thereof.

The composite conductive material may include an inorganic material having any one structure of perovskite, antiperovskite, layered structure, spinel, or NASICON type.

The solid electrolyte layer may include a metal ion conductive material.

According to an aspect of an embodiment, a method of operating a metal-air battery includes: purifying external air introduced into the air purification module to provide purified air; supplying a first moisture from a moisture storage unit to a water vapor supply unit at a first flow rate; supplying the purified air from the air purification module and a first water vapor from the water vapor supply unit to a cell module configured to generate electricity by using oxidation of a metal and reduction of oxygen and water; recovering, by a condensing unit, a second water vapor from the cell module to provide a second moisture; and supplying the second moisture from the condensing unit to the water vapor supply unit at a second flow rate, wherein a flow rate of the water vapor supplied from the water vapor supply unit to the cell module may be determined by a sum of the first moisture supplied from the moisture storage unit at the first flow rate and the second moisture supplied from the condensing unit at the second flow rate.

The cell module may include an anode unit including a metal, a cathode unit that uses oxygen and water as an active material, and a solid electrolyte layer arranged between the anode unit and the cathode unit.

The second flow rate may be determined according to a recovery rate of the condensing unit, and the first flow rate may increase as the second flow rate decreases.

The method may further include interrupting the flow of the first moisture communicated from the moisture storage unit to the water vapor supply unit via a first fluid interrupting unit at the first flow rate, wherein an opening/closing of the first fluid interrupting unit may be determined according to the second flow rate of the second moisture transferred from the condensing unit to the water vapor supply unit.

A recovery rate of the condensing unit may be 0.5 or more and less than 1, and the moisture storage unit may store moisture of 0.1 liter or more and 6.0 liters or less per 1 kWh.

The method may further include applying a negative pressure to the cell module to recover the second water vapor from the cell module.

The cathode unit may include a porous composite conductive material, and the composite conductive material may include a lithium titanium oxide (LTO), a lithium manganese oxide (LMO), a lithium cobalt oxide (LCO), a lithium manganese nickel oxide (LMNO), a lithium nickel manganese cobalt (NMC) oxide, a lithium nickel oxide (LNO), lithium iron phosphate (LFP), lithium iron manganese phosphate (LFMP), a lithium lanthanum titanium oxide (LLTO), lithium aluminum titanium phosphate (LATP), a lithium lanthanum manganese oxide (LLMnO), a lithium lanthanum ruthenium oxide (LLRuO), a reduction product of the porous composite conductive material, or a combination thereof.

The composite conductive material may include an inorganic material having a perovskite structure, an anti-perovskite structure, a layered structure, a spinel structure, a NASICON structure.

The solid electrolyte layer may include a metal ion conductive material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal-air battery according to embodiments will be described in detail with reference to the accompanying drawings. The widths and thicknesses of layers or regions shown in the accompanying drawings may be exaggerated somewhat for clarity of the specification and convenience of description. Like reference numerals denote the same elements throughout the detailed description.

In order to solve the problem caused by the low metal ion conductivity and electron conductivity of the cathode and the solid electrolyte in a metal-air battery, water vapor may be introduced into a cell module as an additive during a discharging process. If water vapor is continuously introduced into the cell module in the process of repetitive charging and discharging, a total weight of the metal-air battery may be increased, thereby decreasing the specific energy of the metal-air battery.

Figure 1:
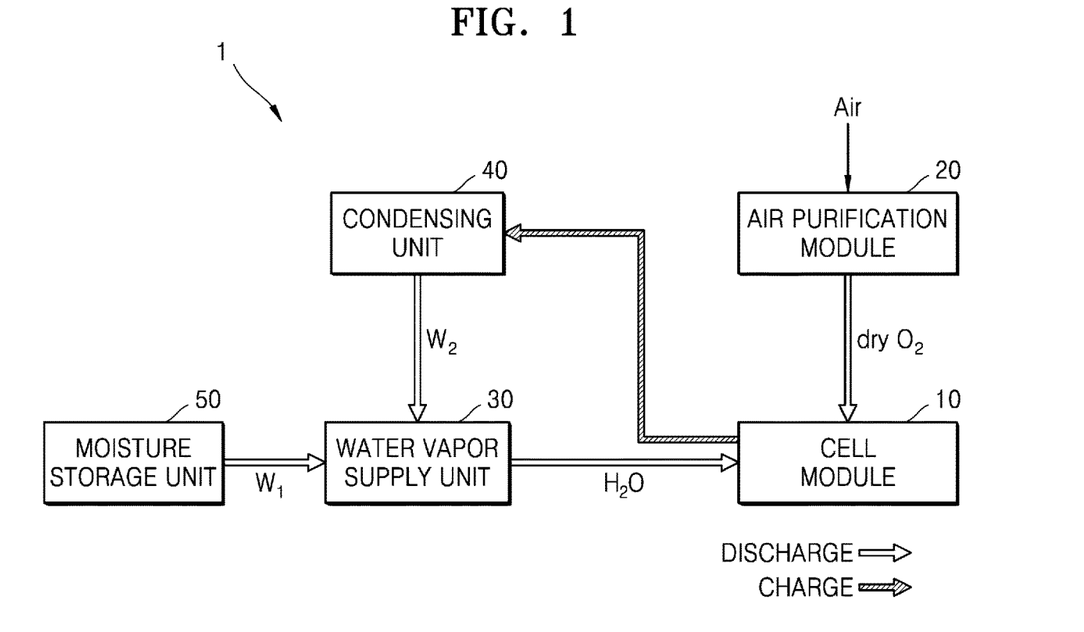
FIG. 1 is an embodiment of a schematic diagram of a metal-air battery.
Figure 2:
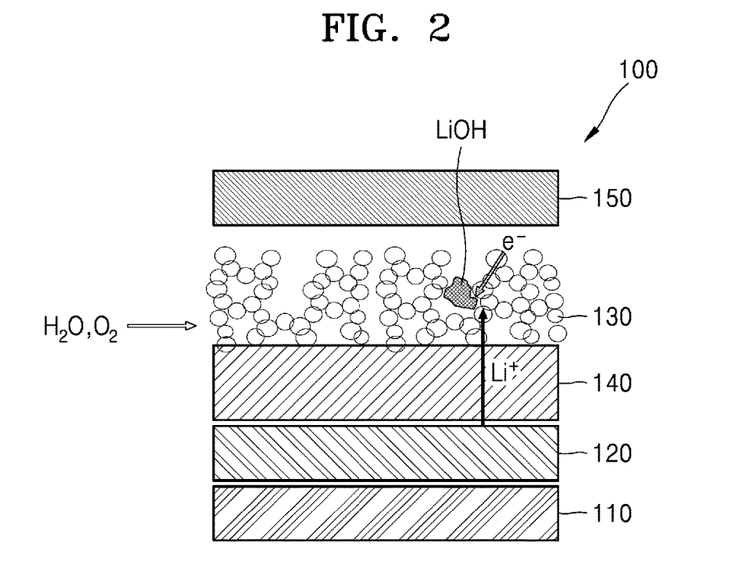
FIG. 2 is an embodiment of a schematic diagram of a cell of the cell module of FIG.

FIG. 1 is an embodiment of a schematic diagram of a metal-air battery 1, and FIG. 2 is an embodiment of a schematic diagram of a cell of the cell module of FIG. 1.

Referring to FIG. 1, a metal-air battery 1 according to an embodiment includes a cell module 10, an air purification module 20, a water vapor supply unit 30, a condensing unit 40, and a moisture storage unit 50. The cell module 10 may include a plurality of cells 100, and may generate electricity by metal oxidation and reduction of oxygen and water vapor. Each of the cells 100 according to an embodiment may include an anode current collector 110, an anode unit 120, a cathode unit 130, a solid electrolyte layer 140, and a cathode current collector 150.

Referring to FIG. 2, the anode current collector 110 may be arranged to come into contact with the anode unit 120 to be further described later. The anode current collector 110 may be arranged on a lower surface of the anode unit 120. Accordingly, the anode unit 120 may be arranged between the anode current collector 110 and the solid electrolyte layer 140. The anode current collector 110 may include, for example, stainless steel (SUS), or other suitable conductor. The anode current collector 110 may be regarded as a part of the anode unit 120.

The anode unit 120 may include a material capable of absorbing and releasing metal ions. The material may include, for example, lithium (Li), sodium (Na), zinc (Zn), potassium (K), calcium (Ca), magnesium (Mg), iron (Fe), aluminum (Al), or an alloy in which at least two of these materials are combined. For example, the anode unit 120 may include lithium (Li). In this case, the anode unit 120 may include at least one of lithium (Li), a lithium-based alloy, and a lithium intercalating compound. When the anode unit 120 includes lithium (Li), the metal-air battery 1 according to the present embodiment may be referred to as a "lithium-air battery."

The cathode unit 130 may be an electrode unit using oxygen ($O_2$) in air and water vapor $H_2O$ as an active material. For an electrochemical reaction of metal ions provided from the anode unit 120 with a gas (e.g., air or oxygen) and water vapor provided to the cathode unit 130, the cathode unit 130 may provide a path for moving metal ions and electrons.

When the metal-air battery 1 according to the present embodiment is a lithium-air battery, the following electrochemical reaction may occur in the cathode unit 130 during discharge.

$$4Li^{+}+O_2+2H_2O+4e^{-}\rightarrow 4LiOH$$

Lithium ions ($Li^+$) provided from the anode unit 120, oxygen $O_2$ and water vapor $H_2O$ provided from the atmosphere (air) are combined (reacted) with electrons ($e^-$) on a surface of the cathode unit 130, and thus, lithium hydroxide (LiOH) may be produced. In this case, the cathode unit 130 may provide both a passage for lithium ions ($Li^+$) and a passage for electrons ($e^-$). Lithium hydroxide (LiOH) produced here may be referred to as an example of a reaction product. During a charging process, a discharge reaction may proceed in reverse. As mentioned above, the cathode unit 130 may provide a path for moving metal ions ($Li^+$) and electrons ($e^-$). As an example, the cation conductivity and the electron conductivity of the cathode unit 130 may be greater than about $10^{-5}$ Siemens per centimeter ($Scm^{-1}$) and greater than about $10^{-4}$ $Scm^{-1}$, respectively. In addition, as an example, the cathode unit 130 may include a porous composite conductive material capable of conducting both electrons and ions. In order to control the cation conductivity and electron conductivity of the composite conductive material, a composition, a dopant, or a content of a dopant of the composite conductive material may be selected. The composite conductive material may include, for example, at least one of a lithium-based oxide or a sodium-based oxide.

As a specific example, the composite conductive material may include a lithium titanium oxide (LTO), a lithium manganese oxide (LMO), a lithium cobalt oxide (LCO), a lithium manganese nickel oxide (LMNO), a lithium nickel manganese cobalt (NMC) oxide, a lithium nickel oxide (LNO), lithium iron phosphate (LFP), lithium iron manganese phosphate (LFMP), a lithium lanthanum titanium oxide (LLTO), lithium aluminum titanium phosphate (LATP), a lithium lanthanum manganese oxide (LLMnO), a lithium lanthanum ruthenium oxide (LLRuO), a reduction product of the porous composite conductive material, or a combination thereof. If desired, ion conduction and electron conduction characteristics of the composite conductive material may be appropriately controlled by selecting the composition or a dopant of the materials described above. However, the specific materials presented here are examples, and various other materials may be used as the composite conductive material. In addition, the composite conductive material may have any suitable structure, and may be a perovskite, anti-perovskite, layered structure, spinel, or NASICON type material. The composite conductive material may be an inorganic material-based solid compound including a metal element. In addition, the composite conductive material may be a non-carbon-based material, e.g. an inorganic material.

The solid electrolyte layer 140 may provide a passage for moving metal ions provided from the anode unit 120. As an example, the solid electrolyte layer 140 may include a metal ion conductive material.

As a specific example, the metal ion conductive material may include at least one of lithium phosphorous oxynitride (LiPON), garnet based lithium lanthanum zirconium oxide (LLZO), perovskite based lithium lanthanum titanium oxide (LLTO), a NASICON based lithium aluminum oxide, a lithium aluminum titanium phosphate (LATP), or a LISICON-based lithium zinc germanium oxide. As an example, although not shown in the drawings, in order to form a stable interface, an anode electrolyte layer may be included between the anode unit 120 and the solid electrolyte layer 140.

As described above, the composite conductive material included in the cathode unit 130 and the metal ion conductive material included in the solid electrolyte layer 140 may be an inorganic material-based solid compound. Accordingly, the cathode unit 130 and the solid electrolyte layer 140 may be electrodes that do not include an organic electrolyte, that is, and may be an organic electrolyte-free electrode. In addition, the cathode unit 130 may be an electrode that does not include a liquid electrolyte, that is, a liquid electrolyte-free electrode.

Although not shown in FIG. 2, the cell 100 may include a gas diffusion layer that absorbs oxygen in the atmosphere and provides the oxygen to the cathode unit 130. To this end, the gas diffusion layer may have a porous structure to smoothly diffuse oxygen. For example, a gas diffusion layer may be formed using carbon paper, carbon cloth, carbon felt, or a sponge-like foamed metal or metal fiber mat. However, the cathode unit 130 may include a porous structure or a structure similar to a porous structure so that the cathode unit 130 performs the role of a gas diffusion layer. In this case, the gas diffusion layer may be omitted.

The cathode current collector 150 may be arranged to contact the gas diffusion layer. As an example, the cathode current collector 150 may include, for example, stainless steel (SUS). In this case, the stainless steel (SUS) of the cathode current collector 150 may have a mesh structure for permeation of air (gas). The material of the cathode current collector 150 is not limited to stainless steel (SUS) and other suitable current collector materials can also be used. When the gas diffusion layer is not used, the cathode current collector 150 may contact the cathode unit 130.

Referring to FIG. 1, the air purification module 20 may purify air by removing impurities, such as moisture and carbon dioxide in the air, and supply the purified air dry-$O_2$ to the cell module 10. The air purification module 20 may be arranged to be in direct fluid communication with the cell module 10. According to an embodiment, the air purification module 20 may be configured to be operated by a pressure swing adsorption (PSA), a thermal swing adsorption (TSA), a pressure thermal swing adsorption (PTSA), a vacuum swing adsorption (VSA), a selective separation method, or two or more of these methods. In the specification, the term "PSA" refers to a technology that operates based on a principle that a specific gas is preferentially adsorbed or trapped by an adsorbent at a high pressure, and a specific gas is desorbed or released when pressure decreases. The term "TSA" refers to a technology that operates based on a principle that a specific gas is preferentially adsorbed or trapped by an adsorbent at room temperature, and, when the temperature increases, the specific gas is desorbed or released The term "PTSA" refers to a technology in which the "PSA" and "TSA" are combined, and the term "VSA" refers to a technology that operates based on a principle that a specific gas is preferentially adsorbed or trapped by an adsorbent at near atmospheric pressure, and the specific gas is desorbed or released under vacuum.

As described with reference to FIG. 2, the metal-air battery 1 according to the present embodiment may be a liquid electrolyte-free battery that does not include a liquid electrolyte. In addition, the metal-air battery 1 according to the present embodiment may be an organic electrolyte-free battery that does not include an organic electrolyte. In this way, the metal-air battery 1 may be an organic electrolyte-free battery or a liquid electrolyte-free battery.

When the cell 100 is implemented as a liquid electrolyte-free all-solid metal-air battery, due to low metal ion conductivity and low electron conductivity of the cathode unit 130 and the solid electrolyte layer 140 and a large interfacial resistance, a problem of reduced reaction rate may occur. Therefore, while the main purpose of an air intake system arranged in a metal-air battery of the related art is to remove moisture, in the present embodiment in which an all-solid metal-air battery is implemented, it is necessary to supply an additive, for example, water vapor, for increasing metal ion conductivity and electron conductivity and reducing interfacial resistance.

The water vapor supply unit 30 is a supply device capable of supplying water vapor $H_2O$ to the cell module 10 in order to improve the metal ion conductivity and electron conductivity of the cathode unit 130 and to reduce the interfacial resistance. As an example, the water vapor supply unit 30 may control a speed of supplying water vapor $H_2O$ according to a charge/discharge speed of the metal-air battery 1.

The water vapor $H_2O$ supplied through the water vapor supply unit 30 is attached to a surface of the cathode unit 130 to improve metal ion conductivity and electron conductivity, and to reduce interfacial resistance. In addition, the water vapor $H_2O$ supplied through the water vapor supply unit 30, together with the purified air dry-$O_2$ provided from the air purification module 20 during a discharging process, is combined (reacted) with electrons ($e^-$) on the surface of the cathode unit 130 to generate lithium hydroxide (LiOH), or may be decomposed from lithium hydroxide (LiOH) during the charging process and returned to water vapor $H_2O$.

As described above, in the metal-air battery 1 according to an embodiment, as the water vapor $H_2O$ together with the purified air dry-$O_2$ is supplied to the cathode unit 130, the metal ion conductivity and the electron conductivity are improved and the interfacial resistance is reduced, and thus, metal ions ($Li^+$) and electrons ($e^-$) may be more easily moved. Therefore, the metal-air battery 1 according to an embodiment is advantageous in improving/maintaining the performance and extending the life of the battery.

The condensing unit 40 may condense water vapor recovered from the cell module 10 and supply the condensed water vapor to the water vapor supply unit 30. As an example, the condensing unit 40 may be a condenser capable of converting water vapor in a gaseous state into water in a liquid state. However, the present disclosure is not limited thereto, and any configuration capable of condensing the water vapor $H_2O$ recovered from the cell module 10 may be used.

As described above, during a charging process in the cell module 10, lithium hydroxide (LiOH), which is a discharge product, may be decomposed to generate water vapor $H_2O$. The condensing unit 40 may recover water vapor $H_2O$ generated in the cell module 10, condense the water vapor $H_2O$ into moisture $H_2O$, and provide the moisture $H_2O$ to the water vapor supply unit 30. In the present specification, moisture $H_2O$ refers to one or more of water vapor in a gaseous state or water in a liquid state. That is, moisture $H_2O$ may denote one of a state in which only gaseous water vapor is included, a state in which only liquid water is included, or a state in which gaseous water vapor and liquid water are mixed.

Moisture $H_2O$ provided to the water vapor supply unit 30 may be provided to the cell module 10 during a discharging process and may be reused. As the water vapor $H_2O$ is reused during a charge and discharging process, the amount of water vapor $H_2O$ to be provided to the metal-air battery 1 may be reduced in a repetitive charge/discharge cycle. Accordingly, the energy density of the metal-air battery 1 may also be increased.

According to an embodiment, the condensing unit 40 may have a predetermined recovery rate. In the present specification, the recovery rate is defined as a ratio of the flow rate of water provided by the condensing unit 40 to the water vapor supply unit 30 with respect to the flow rate of water vapor introduced from the cell module 10 to the condensing unit 40. As an example, when the condensing unit 40 is a condenser, the condensing unit 40 may have a recovery rate of less than 100%. Accordingly, only some of the water vapor $H_2O$ supplied from the cell module 10 may be condensed into moisture $H_2O$ and provided to the water vapor supply unit 30. For example, when the recovery rate of the condensing unit 40 is less than 100%, a flow rate of water vapor $H_2O$ supplied from the water vapor supply unit 30 to the cell module 10 may be greater than a second flow rate $W_2$ of moisture supplied from the condensing unit 40 to the water vapor supply unit 30. A moisture storage unit 50 may be arranged to supplement the flow rate of water vapor $H_2O$ that becomes insufficient as the charge/discharge cycle continues.

The moisture storage unit 50 is a moisture supply unit capable of supplementing and providing moisture $H_2O$ that has not been recovered from the condensing unit 40. The moisture storage unit 50 according to an embodiment may supply moisture at a first flow rate $W_1$ to the water vapor supply unit 30. As an example, the moisture storage unit 50 may be a storage tank capable of storing predetermined moisture. In this case, the storage capacity of the moisture storage unit 50 may be determined according to an energy capacity of the metal-air battery 1 and a recovery rate of the condensing unit 40.

As described above, the condensing unit 40 may have a recovery rate of less than 100%, and accordingly, the second flow rate $W_2$ of the water vapor provided from the condensing unit 40 to the water vapor supply unit 30 may not be constant. In the present specification, the recovery rate of the condensing unit 40 is defined as a ratio of a mass of moisture condensed from the condensing unit 40 and provided to the water vapor supply unit 30 to a mass of water vapor $H_2O$ supplied to the cell module 10 from the water vapor supply unit 30. Because the moisture storage unit 50 is for supplementing a reduced amount of water vapor provided from the condensing unit 40 to the water vapor supply unit 30, the first flow rate $W_1$ of moisture provided from the moisture storage unit 50 to the water vapor supply unit 30 may increase as the second flow rate $W_2$ of water vapor decreases. In addition, the first flow rate $W_1$ of moisture provided from the moisture storage unit 50 to the water vapor supply unit 30 may decrease as the second flow rate $W_2$ of water vapor increases. That is, the first flow rate $W_1$ of moisture provided from the moisture storage unit 50 to the water vapor supply unit 30 and the second flow rate $W_2$ of water vapor provided from the condensing unit 40 to the water vapor supply unit 30 may be inversely proportional to each other. As an example, when the condensing unit 40 has a recovery rate of 0.5 or more and less than 1, the moisture storage unit 50 may store moisture of 0.1 liter (L) or more and 6.0 L or less per 1 kWh of output energy of the metal-air battery 1. Accordingly, the amount of water flowing into the water vapor supply unit 30 may be kept constant, and water vapor $H_2O$ of a constant flow rate may be supplied to the cell module 10.

Figure 3:
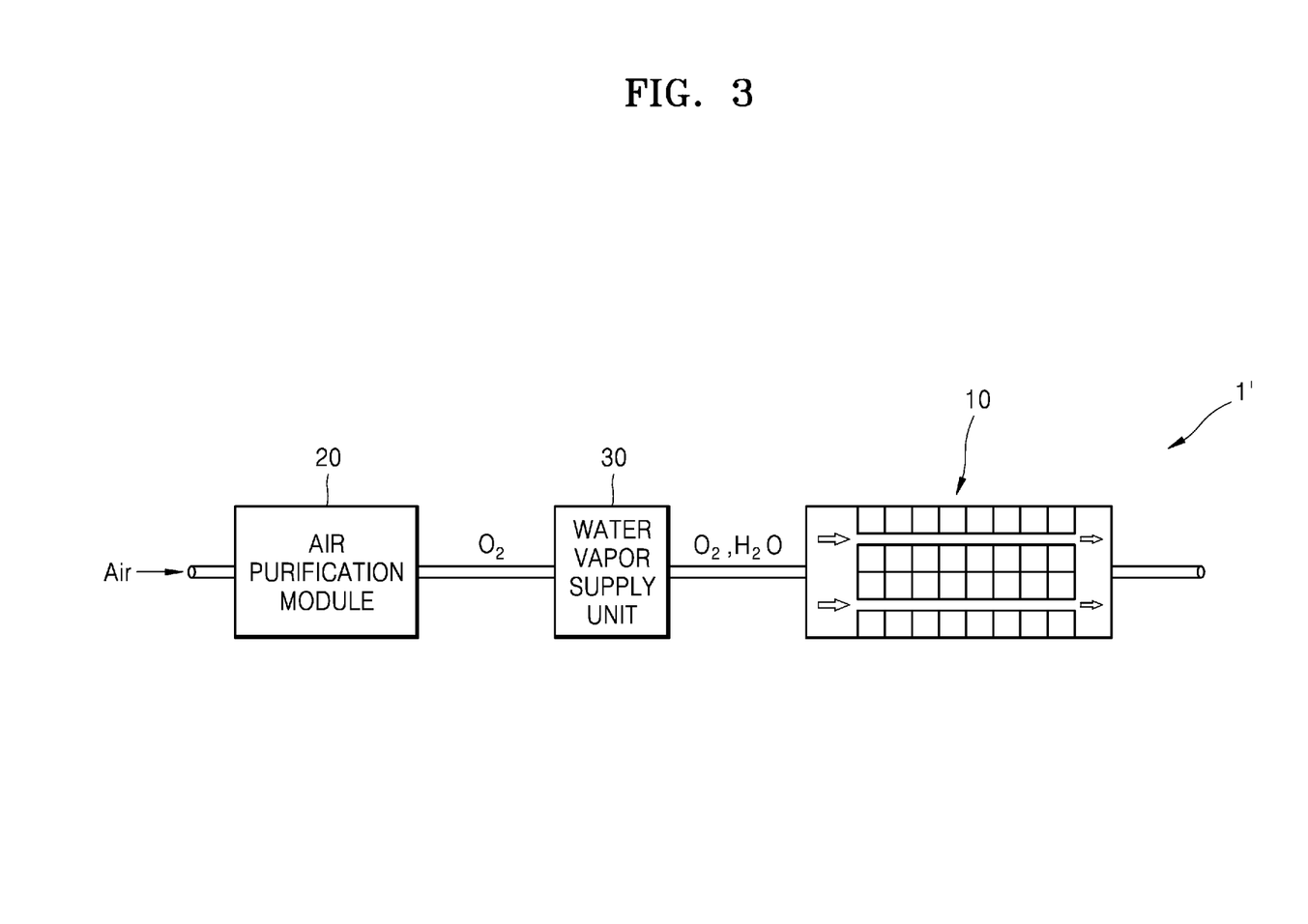
FIG. 3 is a schematic diagram of a metal-air battery according to a comparative example.
Figure 4:
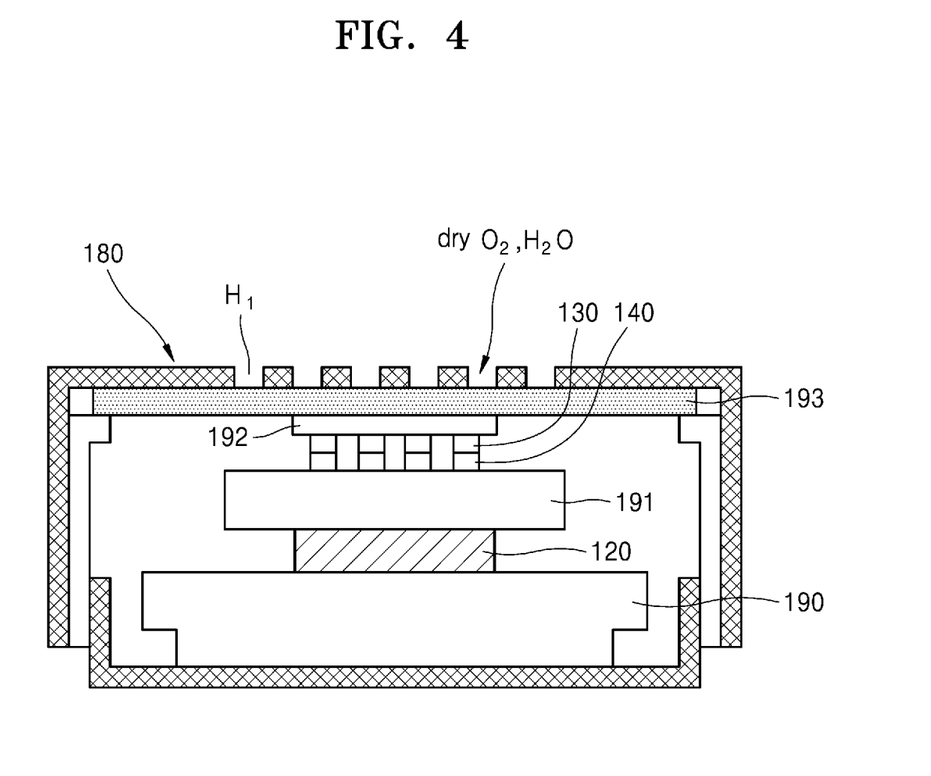
FIG. 4 is a cross-sectional view showing an embodiment of a configuration for testing the performance of the metal-air battery according to embodiments 1 to 3 and the comparative example.

FIG. 3 is a schematic diagram of a metal-air battery 1 according to a comparative example. FIG. 4 is a cross-sectional view showing an embodiment of a configuration for testing the performance of the metal-air battery 1 according to embodiments 1 to 3 and comparative example. The configuration may be an experimental structure for evaluating the performance of the metal-air battery 1.

Referring to FIGS. 1 and 3, embodiment 1 has substantially the same configuration as the configuration illustrated in FIG. 1, and the recovery rate of the condensing unit 40 may be 99%. The metal-air battery 1 according to embodiment 2 has substantially the same configuration as the configuration shown in FIG. 1, and the recovery rate of the condensing unit 40 may be 95%. The metal-air battery 1 according to embodiment 3 has substantially the same configuration as the configuration shown in FIG. 1, and the recovery rate of the condensing unit 40 may be 90%. The metal-air battery 1 according to the comparative example may include a cell module 10, an air purification module 20, and a water vapor supply unit 30 as shown in FIG. 3. The configuration of the metal-air battery according to the comparative example may be substantially the same as the configuration shown in FIG. 1 except that the metal-air battery according to the comparative example does not include the condensing unit 40 or the moisture storage unit 50, and thus, the descriptions of the cell module 10, the air purification module 20, and the water vapor supply unit 30 will be omitted.

Referring to FIGS. 1, 3, and 4, the metal-air batteries according to embodiments 1 to 3 and comparative example have a coin cell form. Constituent elements of the metal-air battery may be provided in a case 180 having a plurality of opening regions $H_1$. A support structure 190 may be arranged on a lower surface of the case 180. The support structure 190 may include, for example, a spacer and a spring member. An anode unit 120 including a metal may be provided on the support structure 190. A reaction inhibition layer 191 may be sequentially provided on the anode unit 120. The reaction inhibition layer 191 is arranged between the anode unit 120 and a solid electrolyte layer 140 and may play a role of suppressing/preventing a reaction therebetween. The reaction inhibition layer 191 may have an ion conduction function.

The cathode unit 130 and the solid electrolyte layer 140 may be arranged on the reaction inhibition layer 191. The cathode unit 130 and the solid electrolyte layer 140 may have a structure including a plurality of voids. In this case, a polymer adhesive layer (not shown) including oxyethylene methacrylate (POEM) may be disposed between the cathode unit 130 and the solid electrolyte layer 140. An electrically conductive material layer (hereinafter, a conductive layer) 192 may be provided on the cathode unit 130, and a gas diffusion layer 193 may be provided on the conductive layer 192. In the embodiment, the gas diffusion layer 193 may be disposed adjacent to the plurality of opening regions $H_1$ and may supply oxygen $O_2$ and water vapor $H_2O$ to the cathode unit 130. In the comparative example, the gas diffusion layer 193 may be disposed adjacent to the plurality of opening regions $H_1$ to supply oxygen dry-$O_2$ to the cathode unit 130. As a specific example, the anode unit 120 may include Li, the cathode unit 130 may include lithium titanium oxide ($Li_4Ti_5O_{12}$) (LTO), and the solid electrolyte layer 140 may include lithium aluminum titanium phosphate (LATP). The conductive layer 192 may include Au.

For the metal-air battery 1 described with reference to FIGS. 1, 3, and 4, purified air dry-$O_2$ and water vapor $H_2O$ are reduced/oxidized on a surface of the cathode unit 130, and, at this time, an amount of water consumed is experimentally confirmed by repeating the charge and discharge experiment. To this end, in comparative example in which the condensing unit 40 is not arranged or in embodiments in which the recovery rate of the condensing unit 40 is different, the moisture consumption evaluation was performed. In addition, the cyclability of the metal-air battery 1 was evaluated by repeatedly performing a charge/discharge experiment on the metal-air battery 1.

Figure 5A:
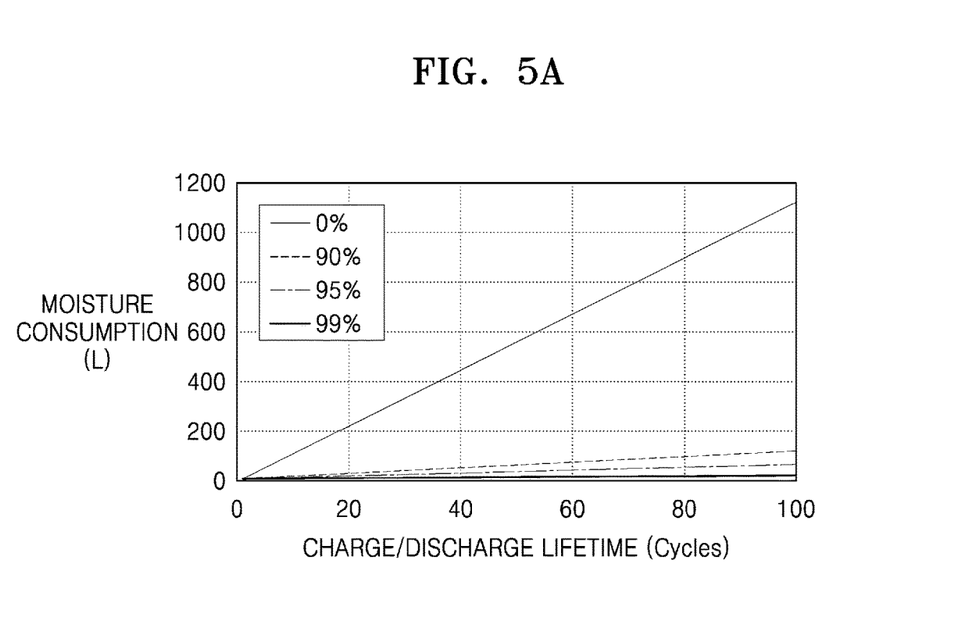
FIG. 5A is a graph of moisture consumption (liter, L) versus charge/discharge time (cycles) showing simulation results for electrochemical modules according to embodiments 1 to 3 and the comparative example.
Figure 5B:
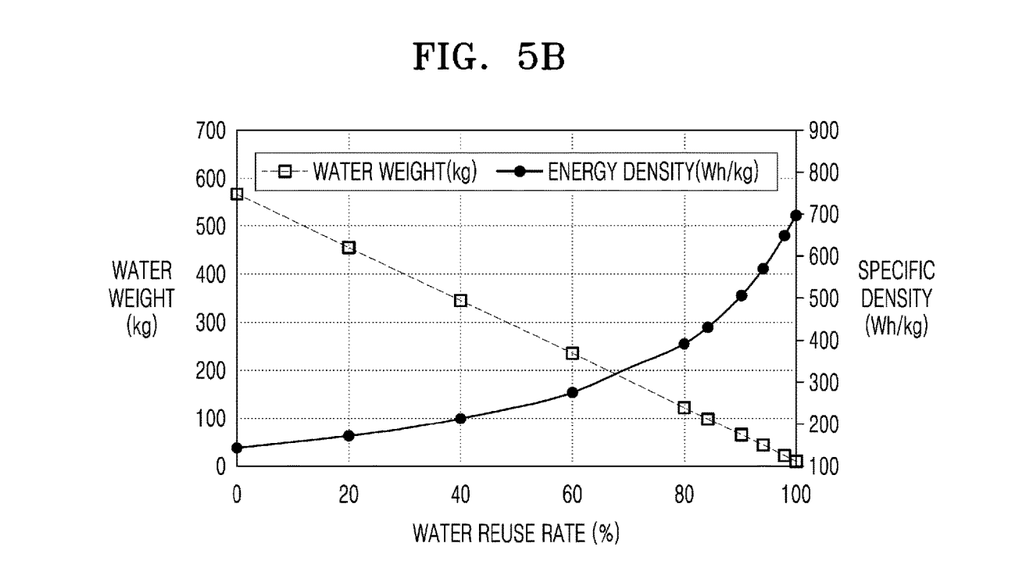
FIG. 5B is a graph of water weight (kilogram, kg) and specific energy (watt-hours per kilogram, Wh/kg) as a function of water reuse rate showing simulation results for electrochemical modules according to embodiments 1 to 3 and the comparative example.

FIGS. 5A and 5B are graphs showing simulation results for electrochemical modules according to embodiments 1 to 3 and comparative example.

Referring to FIGS. 1, 3 and 4, in embodiments 1 to 3 and comparative example, in a battery cell included in the metal-air battery 1, an operating temperature was set to 40° C., water vapor ($H_2O$) and oxygen ($O_2$) were supplied so that a relative humidity was 100%, a charge/discharge cycle was performed with a constant current, and water vapor of the same flow rate was supplied from the water vapor supply unit 30 to the cell module 10. At this time, the condensing unit 40 provided in embodiment 1 has a recovery rate of 99%, the condensing unit 40 provided in embodiment 2 has a recovery rate of 95%, and the condensing unit 40 provided in embodiment 3 has a recovery rate of 90%, and in the comparative example, because the condensing unit 40 is not provided, a recovery rate of 0% is shown. The moisture storage unit 50 transfers moisture as much as an amount that is not recovered from the condensing unit 40 to the water vapor supply unit 30 so that the water vapor of the same flow rate is supplied from the water vapor supply unit 30 to the cell module 10.

As shown in FIG. 5A, in the embodiments and comparative example, in the case of supplying water vapor $H_2O$ and purified air dry-$O_2$ so that the relative humidity is 100% and performing a charge/discharge cycle with a constant current of 1 $\mu A/cm^2$, a predetermined amount of moisture is consumed for each charge/discharge cycle. Moisture required for one discharge of a metal-air battery with a 100 kWh capacity is 11.2 L, and in the case of the Comparative Example in which the condensing unit 40 is not arranged, because water vapor may not be recovered from the cell module 10, 11.2 L of moisture should be supplied from the moisture storage unit 50 to the water vapor supply unit 30 whenever a charge/discharge cycle proceeds. Accordingly, in the case of the Comparative Example, it may be seen that 1120 L of moisture should be provided from the moisture storage unit 50 to the water vapor supply unit 30 during 100 charge/discharge cycles.

On the other hand, in the case of embodiment 1 in which the condensing unit 40 having a recovery rate of 99% is included, 11.088 L of moisture excluding 0.112 L of moisture may be recovered from the condensing unit 40. Accordingly, 0.112 L of moisture should be additionally supplied from the moisture storage unit 50 to the water vapor supply unit 30 for each cycle. Therefore, in the case of embodiment 1, 11.2 L of moisture should be initially supplied and 11.088 L of moisture should be additionally supplied during the 100 charge/discharge cycles, accordingly, it may be seen that the moisture storage unit 50 should store 22.288 L of moisture.

In the case of embodiment 2 in which the condensing unit 40 having a recovery rate of 95% is included, 10.64 L of moisture excluding 0.56 L of moisture may be recovered from the condensing unit 40. Accordingly, 0.56 L of moisture should be additionally supplied from the moisture storage unit 50 to the water vapor supply unit 30 for each cycle. Therefore, in the case of embodiment 2, 11.2 L of moisture should be initially supplied and 55.11 L of moisture should be additionally supplied during the 100 charge/discharge cycles, accordingly, it may be seen that the moisture storage unit 50 should store 66.64 L of moisture.

In the case of embodiment 3 in which the condensing unit 40 having a recovery rate of 90% is included, 10.08 L of moisture excluding 1.12 L of moisture may be recovered from the condensing unit 40. Accordingly, 1.12 L of moisture should be supplied from the moisture storage unit 50 to the water vapor supply unit 30 for each cycle. Therefore, in the case of embodiment 3, 11.2 L of moisture should be initially supplied and 110.88 L of moisture should be additionally supplied during the 100 charge/discharge cycles, accordingly, it may be seen that the moisture storage unit 50 should store 122.08 L of moisture.

In addition, referring to FIG. 5B, an amount of change in a specific energy of the metal-air battery 1 according to the recovery rate of the condensing unit 40 may be confirmed. The specific energy of the metal-air battery 1 is calculated by dividing the capacity of the metal-air battery by a total weight of the metal-air battery. According to embodiments 1 to 3, in the 100 kWh metal-air battery 1 capable of charging and discharging, it may be seen that, as a recovery rate of the condensing unit 40 is reduced to 99%, 95%, and 90%, the specific energy is reduced to 648.8 Wh/kg, 503.9 Wh/kg, and 393.9 Wh/kg respectively. Through this result, it may be seen that, in order to manufacture the metal-air battery 1 of high specific energy, the condensing unit 40 having a high recovery rate is desired.

When checking the embodiments and the comparative example, when the condensing unit 40 is provided, it may be confirmed that the flow rate of moisture to be provided from the moisture storage unit 50 to the water vapor supply unit 30 is reduced according to charge and discharge. In addition, when embodiments 1 to 3 are compared, it may be seen that as the recovery rate of the condensing unit 40 increases, the flow rate of moisture to be provided from the moisture storage unit 50 to the water vapor supply unit 30 decreases. Accordingly, when the condensing unit 40 having a high recovery rate is provided, it may be confirmed that the energy density is improved because a smaller amount of moisture may be stored in the moisture storage unit 50 in the metal-air battery 1 having the same energy capacity. Accordingly, the metal-air battery 1 including a condensing unit 40 having a high recovery rate may be advantageous in improving the performance and extending the life of the battery. Hereinafter, the metal-air battery 1 capable of controlling an amount of moisture in the first flow rate $W_1$ supplied from the moisture storage unit 50 to the water vapor supply unit 30 according to the change in the recovery rate of the condensing unit 40 will be described.

Figure 6:
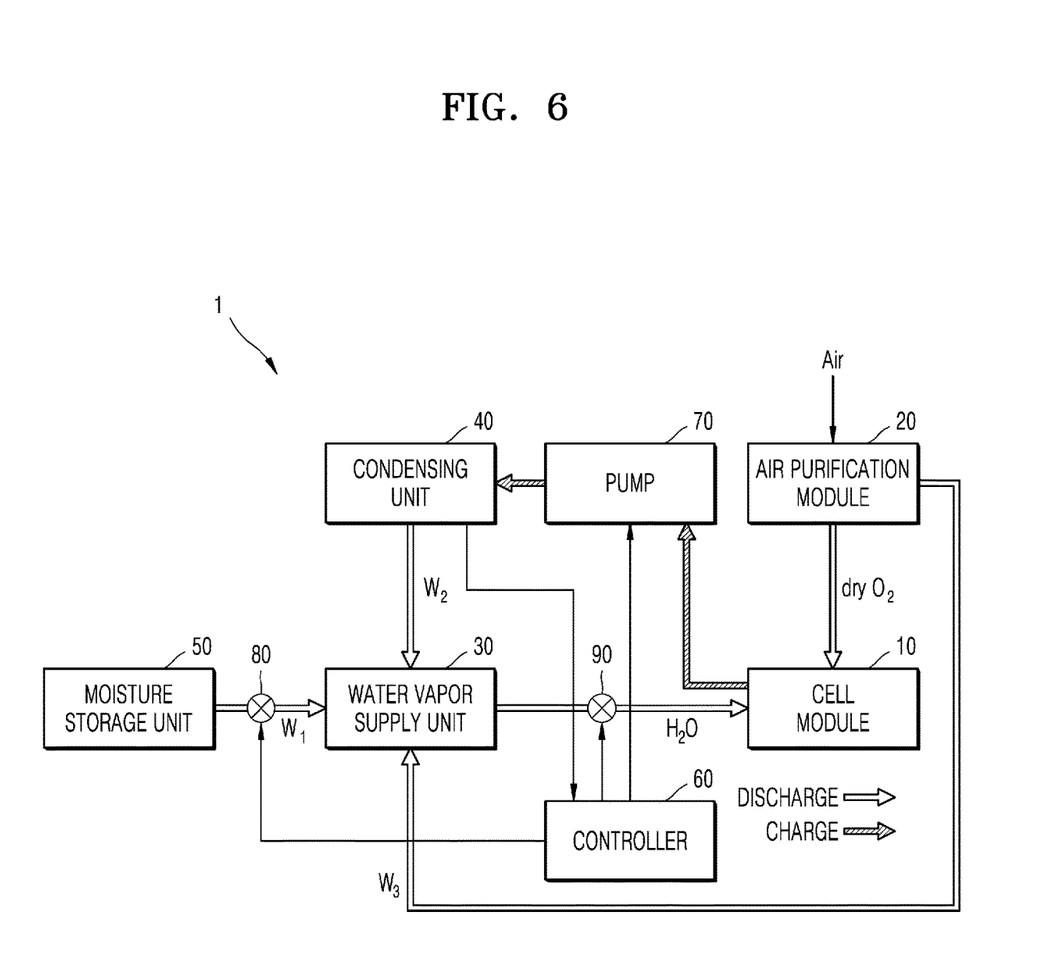
FIG. 6 is a block diagram showing an embodiment of a schematic configuration of a metal-air battery.

FIG. 6 is a block diagram showing a schematic configuration of a metal-air battery 1 according to an embodiment. Because the descriptions related to the cell module 10, the air purification module 20, the water vapor supply unit 30, the condensing unit 40, and the moisture storage unit 50 are substantially the same as those described with reference to FIGS. 1 and 2, and thus, for convenience of explanation, descriptions thereof will be omitted.

A controller 60 is a control device that may control an interruption time and a release time of a first fluid interrupting unit 80 and a second fluid interrupting unit 90 by transmitting control signals for the interruption time and the release time of the first fluid interrupting unit 80 and the second fluid interrupting unit 90 to the first fluid interrupting unit 80 and the second fluid interrupting unit 90 to be described later. In this case, a control signal for the first fluid interrupting unit 80 may be determined by the second flow rate $W_2$ of moisture transferred from the condensing unit 40 to the water vapor supply unit 30. As an example, the controller 60 may include a processor configured to control an overall function and operation of the metal-air battery 1, a program for the operation of the metal-air battery 1, a memory capable of storing necessary data, and a user interface including an input unit and an output unit.

A pump 70 may transfer water vapor from the cell module 10 to the condensing unit 40 by applying a negative pressure to the cell module 10. According to an embodiment, when the pump 70 is operated, water vapor generated from the cathode unit 130 during a charging process may be discharged from the cell module 10 and transferred to the condensing unit 40.

The first fluid interrupting unit 80 is a blocking device that is arranged between the moisture storage unit 50 and the water vapor supply unit 30 to control fluid communication generated between the moisture storage unit 50 and the water vapor supply unit 30. For example, the first fluid interrupting unit 80 may be formed as a check valve or an electronically driven open/close valve, and accordingly, may control the flow of moisture at the first flow rate $W_1$ communicated from the moisture storage unit 50 to the water vapor supply unit 30.

As an example, when a check valve is arranged between the moisture storage unit 50 and the water vapor supply unit 30, moisture may be transferred from the moisture storage unit 50 to the water vapor supply unit 30, but moisture discharged from the water vapor supply unit 30 is interrupted by the check valve, and thus, may not be transferred to the moisture storage unit 50.

The second fluid interrupting unit 90 is a blocking device capable of interrupting fluid communication transmitted from the water vapor supply unit 30 to the cell module 10. For example, the second fluid interrupting unit 90 may be arranged at a discharge unit of the water vapor supply unit 30 to interrupt fluid communication of water vapor transferred to the cell module 10. As an example, the second fluid interrupting unit 90 may be a check valve or an electronically driven open/close valve.

According to an embodiment, the recovery rate of the condensing unit 40 may be set to be fixed, and the flow rate of water vapor recovered from the condensing unit 40 may be changed according to a discharge state of the cell module 10. For example, the recovery rate of the condensing unit 40 may be fixed at 99% depending on the manufacturing setting, and as the charge and discharge of the cell module 10 is repeated, a state inside the cell module 10 may be changed, and thus, the flow rate of water vapor recovered from the condensing unit 40 may be changed.

As the flow rate of water vapor recovered from the condensing unit 40 changes, the second flow rate $W_2$ of moisture transferred from the condensing unit 40 to the water vapor supply unit 30 may also be changed.

Because the flow rate of water vapor transferred from the water vapor supply unit 30 to the cell module 10 should be constant, when the second flow rate $W_2$ of water vapor delivered from the condensing unit 40 to the water vapor supply unit 30 changes, the first flow rate $W_1$ of moisture transferred from the moisture storage unit 50 to the water vapor supply unit 30 may also be changed. According to an embodiment, the controller 60 may detect the second flow rate $W_2$ of moisture delivered from the condensing unit 40 to the water vapor supply unit 30 by using a measuring device (not shown), and may transmit a control signal to the first fluid interrupting unit 80 for changing an opening/closing period of the first fluid interrupting unit 80 according to the change in the flow rate $W_1$. Accordingly, the moisture storage unit 50 may deliver moisture at the first flow rate $W_1$ changed in response to the change in the second flow rate $W_2$ to the water vapor supply unit 30. Accordingly, the water vapor supply unit 30 may supply water vapor having a constant flow rate to the cell module 10 regardless of the flow rate of moisture recovered from the condensing unit 40.

Figure 7:
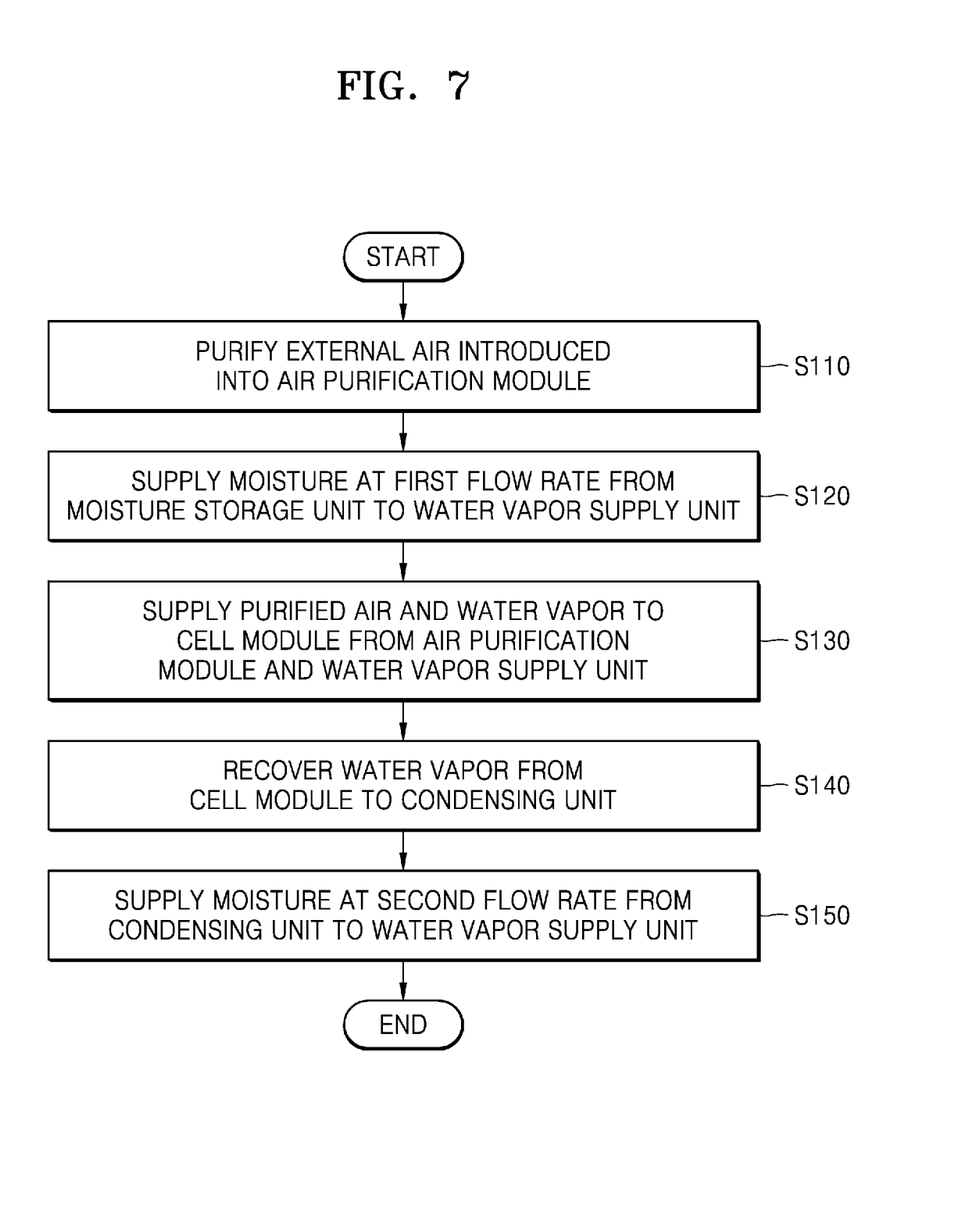
FIG. 7 is a flowchart illustrating an embodiment of a method of operating a metal-air battery.

FIG. 7 is a flowchart illustrating a method of operating a metal-air battery according to an embodiment.

Referring to FIGS. 6 and 7, in operation S110, external air (Air) may be introduced into the air purification module 20, and the air purification module 20 may purify the external air (Air) by removing impurities included in the external air (Air). As an example, the air purification module 20 may generate purified air dry-$O_2$ by removing impurities, such as, water vapor $H_2O$, nitrogen ($N_2$), and carbon dioxide ($CO_2$) in the outside air (Air) using PSA, TSA, PTSA, VSA, a selective separation method, or two or more of these methods. In this case, the purified air dry-$O_2$ may be in a dry oxygen state in which the water vapor $H_2O$ is removed. In addition, the water vapor $H_2O$ removed from the air purification module 20 may be provided to the water vapor supply unit 30.

In operation S120, moisture at the first flow rate $W_1$ may be supplied from the moisture storage unit 50 to the water vapor supply unit 30. As an example, the moisture storage unit 50 is a storage unit capable of storing water vapor $H_2O$ that may be used as an additive in a discharging process of the cell module 10. Accordingly, the moisture storage unit 50 may supply moisture at the first flow rate $W_1$ required in a discharging process to the water vapor supply unit 30.

In operation S130, the purified air dry-$O_2$ and water vapor $H_2O$ may be supplied to the cell module 10 from the air purification module 20 and the water vapor supply unit 30. As an example, when purified air dry-$O_2$ is supplied from the air purification module 20 to the cell module 10 and water vapor $H_2O$ is supplied from the water vapor supply unit 30, purified air ($H_2O+O_2$; $A_2$) including water vapor may be supplied to the cell module 10. When the metal-air battery 1 is discharged by supplying purified air ($H_2O+O_2$; $A_2$)

including water vapor to the cell module 10, the purified air ($H_2O+O_2$; $A_2$) including water vapor may be supplied to the cathode unit 130 that uses water vapor and oxygen as an active material. At this time, as it may be seen from the reaction equation described above, the metal-air battery 1 may generate electricity by generating lithium hydroxide (LiOH) as a reaction product.

In operation S140, water vapor may be recovered from the cell module 10 to the condensing unit 40. As an example, when the metal-air battery 1 is charged, as it may be seen from the reaction equation described above, oxygen ($O_2$) and water vapor $H_2O$ are continuously generated from the cathode unit 130, and thus, the amount of oxygen ($O_2$) and water vapor $H_2O$ may be increased in the cell module 10. Therefore, when the metal-air battery 1 is charged, oxygen ($O_2$) and water vapor $H_2O$ present inside the cell module 10 should be properly discharge to the outside according to usage conditions of the metal-air battery 1 and internal conditions of the cell module 10. According to an embodiment, water vapor $H_2O$ generated during a charging process of the metal-air battery 1 may be recovered through the condensing unit 40. In this case, the pump 70 may apply a negative pressure to the cell module 10 to transfer the water vapor $H_2O$ generated in the charging process to the condensing unit 40. In addition, oxygen ($O_2$) generated during the charging process of the metal-air battery 1 may be discharged to the outside through the cell module 10.

In operation S150, moisture at the second flow rate $W_2$ may be supplied from the condensing unit 40 to the water vapor supply unit 30. In a charging process of the metal-air battery 1, water vapor $H_2O$ generated in the cell module 10 may be recovered through the condensing unit 40. In this case, the condensing unit 40 may condense the water vapor $H_2O$ generated in the cell module 10 and transfer the moisture at the second flow rate $W_2$ to the water vapor supply unit 30. Accordingly, the water vapor $H_2O$ recovered in the condensing unit 40 may be transferred to the water vapor supply unit 30 and reused. Accordingly, the flow rate of water vapor $H_2O$ supplied from the water vapor supply unit 30 to the cell module 10 may be determined by the sum of the moisture at the first flow rate $W_1$ supplied from the moisture storage unit 50 and the second flow rate $W_2$ supplied from the condensing unit 40.

According to an embodiment, the second flow rate $W_2$ supplied from the condensing unit 40 may be determined according to the recovery rate of the condensing unit 40. In addition, when the flow rate of water vapor $H_2O$ supplied from the water vapor supply unit 30 to the cell module 10 is constant, the first flow rate $W_1$ supplied from the moisture storage unit 50 and the second flow rate $W_2$ supplied from the condensing unit 40 may be in inverse proportion to each other. Accordingly, when the second flow rate $W_2$ supplied from the condensing unit 40 changes, the first flow rate $W_1$ supplied from the moisture storage unit 50 may also change. As an example, the first fluid interrupting unit 80 may regulate and control the first flow rate $W_1$ supplied from the moisture storage unit 50.

In addition, according to an embodiment, moisture at a third flow rate $W_3$ removed from the air purification module 20 may be additionally transferred to the water vapor supply unit 30. Accordingly, the water vapor $H_2O$ removed from the air purification module 20 may be transferred to the water vapor supply unit 30 and reused. Accordingly, the flow rate of the water vapor $H_2O$ supplied from the water vapor supply unit 30 to the cell module 10 may be determined by the sum of moisture at the first flow rate $W_1$ supplied from the moisture storage unit 50, moisture at the second flow rate $W_2$ supplied from the condensing unit 40, and moisture at the third flow rate $W_3$ removed from the air purification module 20. Accordingly, the amount of moisture stored in the moisture storage unit 50 may be reduced by reducing the moisture at the first flow rate $W_1$ supplied from the moisture storage unit 50 and the moisture at the third flow rate $W_3$ supplied from air purification module 20.

Although many items are specifically described in the above description, they should be construed as examples of specific embodiments rather than limiting the scope of the invention. For example, it will be understood by those of ordinary skill in the art that the structure of a metal-air battery according to an embodiment may be variously modified. Therefore, the scope of the inventive concept is defined not by the detailed description of the invention but by the appended claims.

A metal-air battery having high performance and a method of operating the metal-air battery may be implemented. A metal-air battery having high charge and discharge characteristics and a method of operating the metal-air battery may be implemented. An all-solid metal-air battery capable of improving metal ion conductivity and electron conductivity by adding water vapor and reducing interfacial resistance and a method of operating the metal-air battery may be provided. A metal-air battery having improved energy density and a method of operating the metal-air battery may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
a cell module configured to generate electricity by oxidation of a metal and reduction of oxygen and water;
a water vapor supply unit configured to supply a first water vapor to the cell module;
a moisture storage unit configured to supply a first moisture at a first flow rate to the water vapor supply unit; and
a condensing unit configured to supply a second moisture at a second flow rate to the water vapor supply unit by condensing a second water vapor condensed from the cell module.

2. The metal-air battery of claim 1, wherein the second flow rate is determined according to a recovery rate of the condensing unit, and the first flow rate is configured to increase as the second flow rate decreases.

3. The metal-air battery of claim 2, wherein the recovery rate of the condensing unit is 0.5 or more and less than 1, and the moisture storage unit stores 0.1 liter or more to 6 liters or less of moisture per 1 kilowatt-hour of an output energy of the metal-air battery.

4. The metal-air battery of claim 3, further comprising a first fluid interrupting unit configured to interrupt a flow of the first moisture at the first flow rate, which is communicated from the moisture storage unit to the water vapor supply unit.

5. The metal-air battery of claim 4, further comprising a controller configured to control whether to open or close the first fluid interrupting unit according to the second flow rate of the second moisture transferred from the condensing unit to the water vapor supply unit.

6. The metal-air battery of claim 1, further comprising a pump configured to apply a negative pressure to the cell module to recover the second water vapor from the cell module.

7. The metal-air battery of claim 1, further comprising an air purification module configured to purify air supplied from outside of the metal-air battery and to provide purified air to the cell module.

8. The metal-air battery of claim 1, wherein the cell module comprises:
an anode unit comprising a metal;
a cathode unit configured to use oxygen and water as an active material; and
a solid electrolyte layer disposed between the anode unit and the cathode unit.

9. The metal-air battery of claim 8, wherein
the cathode unit comprises a porous composite conductive material, and
the porous composite conductive material comprises a lithium titanium oxide, a lithium manganese oxide, a lithium cobalt oxide, a lithium manganese nickel oxide, a lithium nickel manganese cobalt oxide, a lithium nickel oxide, lithium iron phosphate, lithium iron manganese phosphate, a lithium lanthanum titanium oxide, lithium aluminum titanium phosphate, a lithium lanthanum manganese oxide, a lithium lanthanum ruthenium oxide, a reduction product of the composite conductive material, or a combination thereof.

10. The metal-air battery of claim 9, wherein the composite conductive material comprises an inorganic material having any one of structures of perovskite, anti-perovskite, layered structure, spinel, or NASICON type.

11. The metal-air battery of claim 8, wherein the solid electrolyte layer comprises a metal ion conductive material.

12. A method of operating a metal-air battery, the method comprising:
purifying external air introduced into an air purification module to provide purified air;
supplying a first moisture from a moisture storage unit to a water vapor supply unit at a first flow rate;
supplying the purified air from the air purification module and a first water vapor from the water vapor supply unit to a cell module configured to generate electricity by using oxidation of a metal and reduction of oxygen and water;
recovering, by a condensing unit, a second water vapor from the cell module to provide a second moisture; and
supplying the second moisture from the condensing unit to the water vapor supply unit at a second flow rate, wherein
a flow rate of the water vapor supplied from the water vapor supply unit to the battery module is determined by a sum of the first moisture supplied from the moisture storage unit at the first flow rate and the second moisture supplied from the condensing unit at the second flow rate.

13. The method of claim 12, wherein the cell module comprises:
an anode unit including a metal;
a cathode unit that uses oxygen and water as an active material; and
a solid electrolyte layer arranged between the anode unit and the cathode unit.

14. The method of claim 12, wherein the second flow rate is determined according to a recovery rate of the condensing unit, and the first flow rate increases as the second flow rate decreases.

15. The method of claim 12, further comprising interrupting the flow of the first moisture communicated from the moisture storage unit to the water vapor supply unit via a first fluid interrupting unit at the first flow rate, wherein
an opening/closing of the first fluid interrupting unit is determined according to the second flow rate of the second moisture transferred from the condensing unit to the water vapor supply unit.

16. The method of claim 14, wherein a recovery rate of the condensing unit is 0.5 or more and less than 1, and the moisture storage unit stores moisture of 0.1 liter or more and 6.0 liters or less per 1 kilowatt-hour.

17. The method of claim 12, further comprising applying a negative pressure to the cell module to recover the second water vapor from the cell module.

18. The method of claim 12, wherein
the cathode unit comprises a porous composite conductive material, and
the composite conductive material comprises a lithium titanium oxide, a lithium manganese oxide, a lithium cobalt oxide, a lithium manganese nickel oxide, a lithium nickel manganese cobalt oxide, a lithium nickel oxide, lithium iron phosphate, lithium iron manganese phosphate, a lithium lanthanum titanium oxide, lithium aluminum titanium phosphate, a lithium lanthanum manganese oxide, a lithium lanthanum ruthenium oxide, a reduction product of the composite conductive material, or combination thereof.

19. The method of claim 18, wherein the composite conductive material comprises an inorganic material having any a perovskite structure, an anti-perovskite structure, layered structure, a spinel structure, or a NASICON structure.

20. The method of claim 12, wherein the solid electrolyte layer comprises a metal ion conductive material.

* * * * *